(12) United States Patent
Lagerstedt et al.

(10) Patent No.: US 10,606,290 B2
(45) Date of Patent: Mar. 31, 2020

(54) CONTROLLING AN OPERATING CONDITION OF A THERMOSTAT

(71) Applicant: ASSA ABLOY AB, Stockholm (SE)

(72) Inventors: Stig Lagerstedt, Richardson, TX (US); Daniel Berg, Sundbyberg (SE); Daniel Bailin, Castle Rock, CO (US); Mark Robinton, Lebanon, NH (US); Masha Leah Davis, Austin, TX (US)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 15/974,529

(22) Filed: May 8, 2018

(65) Prior Publication Data

US 2018/0259986 A1 Sep. 13, 2018

Related U.S. Application Data (63) Continuation of application No. 14/417,645, filed as application No. PCT/IB2013/002379 on Jul. 26, 2013, now Pat. No. 10,001,791.

(Continued)

(51) Int. Cl.
*G05D 23/19* (2006.01)
*H04W 4/029* (2018.01)
(Continued)

(52) U.S. Cl.
CPC ..... *G05D 23/1932* (2013.01); *G05D 23/1917* (2013.01); *H04L 12/282* (2013.01);
(Continued)

(58) Field of Classification Search
CPC ............ G05D 23/1917; G05D 23/1932; F24F 2011/0057; F24F 11/0034; F24F 11/0076;
(Continued)

(56) References Cited

U.S. PATENT DOCUMENTS 4,235,101 A 11/1980 Stadelmann
4,338,493 A 7/1982 Stenhuis et al.
(Continued)

FOREIGN PATENT DOCUMENTS

CA 2606067 4/2008
CN 1426073 11/2001
(Continued)

OTHER PUBLICATIONS

"About Near Field Communication," NFC Forum, © 2005, 3 pages.
(Continued)

*Primary Examiner* — Chun Cao
(74) *Attorney, Agent, or Firm* — Schwegman Lundberg & Woessner, P.A.

(57) ABSTRACT

Methods, systems, and devices for managing energy consumption in multi-room facilities are provided. In particular, intelligent mechanisms for determining a location of a mobile device associated with a room and then for managing energy settings, especially setback controls, of that room are provided. Some logic for implementing these mechanisms may be provided in a mobile device and in-room device, such as a motion detector, thermostat, HVAC controller, door, lock, television, set top box, etc.

19 Claims, 5 Drawing Sheets

Related U.S. Application Data (60) Provisional application No. 61/676,728, filed on Jul. 27, 2012.

(51) Int. Cl.
    | | | |
    |---|---|---|
    | *H04M 1/725* | (2006.01) | |
    | *H04L 12/28* | (2006.01) | |
    | *H04W 4/021* | (2018.01) | |
    | *H04W 4/33* | (2018.01) | |
    | *H04L 29/08* | (2006.01) | |
    | *H04W 4/02* | (2018.01) | |
    | *H04W 4/50* | (2018.01) | |

(52) U.S. Cl.
    CPC .... *H04L 12/2814* (2013.01); *H04M 1/72572* (2013.01); *H04W 4/021* (2013.01); *H04W 4/029* (2018.02); *H04W 4/33* (2018.02); *H04L 67/12* (2013.01); *H04L 67/125* (2013.01); *H04L 2012/2841* (2013.01); *H04W 4/026* (2013.01); *H04W 4/027* (2013.01); *H04W 4/50* (2018.02)

(58) Field of Classification Search
    CPC ....... F24F 2011/0013; F24F 2011/0064; F24F 11/00; F24F 11/0015
    See application file for complete search history.

(56) References Cited

U.S. PATENT DOCUMENTS

| | | |
|---|---|---|
| 4,497,031 A | 1/1985 | Froehling et al. |
| 4,557,072 A | 12/1985 | Rittmeister et al. |
| 4,850,040 A | 7/1989 | Teich et al. |
| D327,642 S | 7/1992 | Foubister |
| 5,128,792 A | 7/1992 | Teich et al. |
| D330,507 S | 10/1992 | Foubister |
| 5,153,560 A | 10/1992 | Ichikawa |
| D331,409 S | 12/1992 | Goldsmith et al. |
| 5,321,963 A | 6/1994 | Goldman et al. |
| 5,344,068 A | 9/1994 | Haessig |
| 5,395,042 A | 3/1995 | Riley et al. |
| 5,544,321 A | 8/1996 | Theimer et al. |
| 5,544,809 A | 8/1996 | Keating et al. |
| 5,591,950 A | 1/1997 | Imedio-Ocana |
| 5,610,489 A | 3/1997 | Hart et al. |
| 5,620,137 A | 4/1997 | Coelho et al. |
| 5,628,777 A | 5/1997 | Moberg et al. |
| 5,629,981 A | 5/1997 | Nerlikar |
| 5,636,264 A | 6/1997 | Sulavuori et al. |
| 5,709,134 A | 1/1998 | Ulm |
| 5,733,188 A | 3/1998 | Jacob |
| 5,909,378 A | 6/1999 | De Milleville |
| 5,934,554 A | 8/1999 | Charles et al. |
| 6,026,303 A | 2/2000 | Minamisawa |
| 6,031,825 A | 2/2000 | Kaikuranta et al. |
| 6,141,595 A | 10/2000 | Gloudeman et al. |
| 6,160,881 A | 12/2000 | Beyda et al. |
| 6,185,483 B1 | 2/2001 | Drees |
| 6,194,997 B1 | 2/2001 | Buchner et al. |
| 6,226,515 B1 | 5/2001 | Pauli et al. |
| 6,290,140 B1 | 9/2001 | Pesko et al. |
| 6,313,745 B1 | 11/2001 | Suzuki |
| 6,400,961 B1 | 6/2002 | Lillie et al. |
| 6,442,211 B1 | 8/2002 | Hampel et al. |
| 6,462,663 B1 | 10/2002 | Wilson et al. |
| 6,478,084 B1 | 11/2002 | Kumar et al. |
| 6,486,778 B2 | 11/2002 | Mahler et al. |
| 6,536,675 B1 | 3/2003 | Pesko et al. |
| 6,549,643 B1 | 4/2003 | Toklu et al. |
| 6,578,888 B1 | 6/2003 | Fayngersh et al. |
| 6,580,354 B1 | 6/2003 | Schweiger et al. |
| 6,657,316 B1 | 12/2003 | Smith et al. |
| 6,664,710 B1 | 12/2003 | Gottlieb et al. |
| 6,668,058 B2 | 12/2003 | Grimes |
| D484,883 S | 1/2004 | Metivier et al. |
| 6,685,257 B1 | 2/2004 | Beland et al. |
| 6,731,200 B2 | 5/2004 | Wagner et al. |
| 6,734,648 B2 | 5/2004 | Fukumura et al. |
| 6,772,049 B2 | 8/2004 | Choi |
| 6,825,662 B2 | 11/2004 | Nistler et al. |
| 6,825,761 B2 | 11/2004 | Christ et al. |
| 6,828,755 B1 | 12/2004 | Iverson et al. |
| 6,832,072 B2 | 12/2004 | Buckingham et al. |
| 6,851,067 B2 | 2/2005 | Indefrey et al. |
| 6,870,340 B2 | 3/2005 | Fukumura et al. |
| 6,883,420 B2 | 4/2005 | Kuttalek |
| 6,883,515 B2 | 4/2005 | Kuttalek |
| 6,895,791 B2 | 5/2005 | Alexander et al. |
| 6,904,905 B2 | 6/2005 | Kuttalek |
| 6,907,300 B2 | 6/2005 | O'Mahoney et al. |
| D512,297 S | 12/2005 | Metivier et al. |
| D512,898 S | 12/2005 | Metivier et al. |
| 6,972,660 B1 | 12/2005 | Montgomery, Jr. et al. |
| 6,975,202 B1 | 12/2005 | Rodriguez et al. |
| 6,975,212 B2 | 12/2005 | Crenshaw et al. |
| 7,007,985 B2 | 3/2006 | Alexander et al. |
| D520,848 S | 5/2006 | Metivier et al. |
| 7,043,063 B1 | 5/2006 | Noble et al. |
| 7,053,757 B2 | 5/2006 | Buckingham et al. |
| 7,058,477 B1 | 6/2006 | Rosen |
| 7,061,393 B2 | 6/2006 | Buckingham et al. |
| D526,556 S | 8/2006 | Metivier et al. |
| 7,091,831 B2 | 8/2006 | Crenshaw et al. |
| 7,123,139 B2 | 10/2006 | Sweeney |
| 7,127,369 B2 | 10/2006 | Fukumura et al. |
| D532,421 S | 11/2006 | Metivier et al. |
| 7,142,112 B2 | 11/2006 | Buckingham et al. |
| 7,149,503 B2 | 12/2006 | Aarnio et al. |
| 7,170,395 B2 | 1/2007 | Crenshaw et al. |
| 7,216,032 B2 | 5/2007 | Graf et al. |
| 7,236,572 B2 | 6/2007 | Maschke |
| 7,245,938 B2 | 7/2007 | Sobczak et al. |
| 7,248,718 B2 | 7/2007 | Comaniciu et al. |
| 7,290,288 B2 | 10/2007 | Gregg et al. |
| 7,304,406 B2 | 12/2007 | Behringer |
| 7,317,970 B2 | 1/2008 | Pienta et al. |
| 7,319,280 B1 | 1/2008 | Landry et al. |
| 7,333,003 B1 | 2/2008 | Landry et al. |
| 7,337,409 B2 | 2/2008 | Doblmayr et al. |
| 7,356,086 B1 | 4/2008 | Landry et al. |
| D569,279 S | 5/2008 | Krebs et al. |
| 7,380,210 B2 | 5/2008 | Lontka et al. |
| 7,391,224 B2 | 6/2008 | Wild |
| RE40,492 E | 9/2008 | Grimes et al. |
| 7,421,247 B2 | 9/2008 | Buckingham et al. |
| 7,444,201 B2 | 10/2008 | Dirnfeldner |
| 7,466,841 B2 | 12/2008 | Bahlmann et al. |
| 7,483,397 B2 | 1/2009 | Meier et al. |
| 7,505,450 B2 | 3/2009 | Castagnoli |
| 7,515,033 B2 | 4/2009 | Roosli et al. |
| 7,519,378 B2 | 4/2009 | Goertz et al. |
| 7,519,379 B2 | 4/2009 | Goertz et al. |
| 7,528,704 B2 | 5/2009 | Das et al. |
| 7,536,437 B2 | 5/2009 | Zmolek |
| 7,558,402 B2 | 7/2009 | Zhou et al. |
| 7,564,842 B2 | 7/2009 | Callaway, Jr. et al. |
| 7,610,534 B1 | 10/2009 | Jacobson |
| 7,639,841 B2 | 12/2009 | Zhu et al. |
| 7,643,908 B2 | 1/2010 | Quirino et al. |
| 7,664,840 B2 | 2/2010 | O'Neal et al. |
| 7,706,778 B2 | 4/2010 | Lowe |
| 8,074,271 B2 | 12/2011 | Davis et al. |
| 8,102,799 B2 | 1/2012 | Alexander et al. |
| 8,108,076 B2 | 1/2012 | Imes et al. |
| 8,112,794 B2 | 2/2012 | Little et al. |
| 8,386,082 B2 | 2/2013 | Oswald |
| 8,495,722 B1 | 7/2013 | McCusker |
| 8,504,097 B1 | 8/2013 | Cope et al. |
| 8,556,188 B2 * | 10/2013 | Steinberg ................. F24F 11/30 236/51 |
| 8,683,560 B1 | 3/2014 | Brooker et al. |
| 8,730,004 B2 | 5/2014 | Elfstrom et al. |
| 9,124,437 B2 | 9/2015 | Brisco et al. |

(56) References Cited

U.S. PATENT DOCUMENTS

| | | | |
|---|---|---|---|
| 9,160,727 B1 | 10/2015 | Saylor et al. | |
| 9,332,432 B2 | 5/2016 | Low et al. | |
| 10,001,791 B2 | 6/2018 | Lagerstedt et al. | |
| 10,050,948 B2 | 8/2018 | Lagerstedt et al. | |
| 10,145,577 B2* | 12/2018 | Bruck | G05D 23/1904 |
| 2002/0113695 A1 | 8/2002 | Ernst et al. | |
| 2002/0131374 A1 | 9/2002 | Lee | |
| 2003/0087678 A1 | 5/2003 | Smith et al. | |
| 2003/0130960 A1 | 7/2003 | Fraser et al. | |
| 2003/0149576 A1 | 8/2003 | Sunyich | |
| 2003/0194350 A1 | 10/2003 | Stamatelos et al. | |
| 2004/0022334 A1 | 2/2004 | Roosli et al. | |
| 2004/0059815 A1 | 3/2004 | Buckingham et al. | |
| 2004/0083128 A1 | 4/2004 | Buckingham et al. | |
| 2004/0180646 A1 | 9/2004 | Donley et al. | |
| 2004/0192423 A1 | 9/2004 | Nevermann | |
| 2004/0203356 A1 | 10/2004 | Takatori et al. | |
| 2004/0208151 A1 | 10/2004 | Haverinen et al. | |
| 2004/0215723 A1 | 10/2004 | Chadha | |
| 2004/0227623 A1 | 11/2004 | Pozsgay | |
| 2004/0233928 A1 | 11/2004 | Pozsgay | |
| 2004/0242202 A1 | 12/2004 | Torvinen | |
| 2004/0246256 A1 | 12/2004 | Parakkuth et al. | |
| 2004/0260611 A1 | 12/2004 | Raz et al. | |
| 2004/0260612 A1 | 12/2004 | Raz et al. | |
| 2005/0001557 A1 | 1/2005 | Walko, Jr. et al. | |
| 2005/0029867 A1 | 2/2005 | Wood | |
| 2005/0044402 A1 | 2/2005 | Libin et al. | |
| 2005/0091338 A1 | 4/2005 | de la Huerga | |
| 2005/0108417 A1 | 5/2005 | Haumont | |
| 2005/0120727 A1 | 6/2005 | Flinner et al. | |
| 2005/0193932 A1 | 9/2005 | Denison et al. | |
| 2005/0198179 A1 | 9/2005 | Savilampi | |
| 2005/0204167 A1 | 9/2005 | Conlin et al. | |
| 2005/0206725 A1 | 9/2005 | Buckingham et al. | |
| 2005/0242970 A1 | 11/2005 | Blaker et al. | |
| 2005/0248441 A1 | 11/2005 | Crenshaw et al. | |
| 2005/0253690 A1 | 11/2005 | Crenshaw et al. | |
| 2005/0266798 A1 | 12/2005 | Moloney et al. | |
| 2005/0285445 A1 | 12/2005 | Wruck et al. | |
| 2006/0010442 A1 | 1/2006 | Desai et al. | |
| 2006/0019637 A1 | 1/2006 | Becker et al. | |
| 2006/0063523 A1 | 3/2006 | McFarland | |
| 2006/0064477 A1 | 3/2006 | Renkis | |
| 2006/0082454 A1 | 4/2006 | Fukuda et al. | |
| 2006/0097843 A1 | 5/2006 | Libin | |
| 2006/0100002 A1 | 5/2006 | Luebke et al. | |
| 2006/0106499 A1 | 5/2006 | Roosli et al. | |
| 2006/0107307 A1 | 5/2006 | Knox et al. | |
| 2006/0124541 A1 | 6/2006 | Logan et al. | |
| 2006/0132301 A1 | 6/2006 | Stilp | |
| 2006/0158344 A1 | 7/2006 | Bambini et al. | |
| 2006/0164205 A1 | 7/2006 | Buckingham et al. | |
| 2006/0164206 A1 | 7/2006 | Buckingham et al. | |
| 2006/0193310 A1 | 8/2006 | Landry et al. | |
| 2006/0193313 A1 | 8/2006 | Landry et al. | |
| 2006/0193336 A1 | 8/2006 | Landry et al. | |
| 2006/0203295 A1 | 9/2006 | D'Silva et al. | |
| 2007/0050240 A1 | 3/2007 | Belan et al. | |
| 2007/0057810 A1 | 3/2007 | Bos et al. | |
| 2007/0078782 A1 | 4/2007 | Ono et al. | |
| 2007/0097993 A1 | 5/2007 | Bojahra et al. | |
| 2007/0102511 A1 | 5/2007 | Park | |
| 2007/0103550 A1 | 5/2007 | Frank et al. | |
| 2007/0115827 A1 | 5/2007 | Boehnke et al. | |
| 2007/0130294 A1 | 6/2007 | Nishio | |
| 2007/0206537 A1 | 9/2007 | Cam-Winget et al. | |
| 2007/0223596 A1 | 9/2007 | Fan | |
| 2007/0233323 A1 | 10/2007 | Wiemeye et al. | |
| 2007/0239374 A1 | 10/2007 | Dougherty et al. | |
| 2007/0289012 A1 | 12/2007 | Baird | |
| 2008/0008157 A1 | 1/2008 | Edge et al. | |
| 2008/0074059 A1 | 3/2008 | Ahmed | |
| 2008/0076346 A1 | 3/2008 | Ahmed | |
| 2008/0083234 A1 | 4/2008 | Krebs et al. | |
| 2008/0083834 A1 | 4/2008 | Krebs et al. | |
| 2008/0089277 A1* | 4/2008 | Alexander | H04L 12/2816 370/328 |
| 2008/0099570 A1 | 5/2008 | Krebs et al. | |
| 2008/0160984 A1 | 7/2008 | Benes et al. | |
| 2008/0163361 A1 | 7/2008 | Davis et al. | |
| 2008/0175210 A1 | 7/2008 | Jamieson | |
| 2008/0219444 A1 | 9/2008 | Benteo et al. | |
| 2008/0283621 A1 | 11/2008 | Quirino et al. | |
| 2008/0289025 A1 | 11/2008 | Schneider | |
| 2009/0001069 A1 | 1/2009 | Bally et al. | |
| 2009/0032010 A1 | 2/2009 | Hoffmeier | |
| 2009/0037985 A1 | 2/2009 | Bentley et al. | |
| 2009/0040038 A1 | 2/2009 | Huber | |
| 2009/0055561 A1 | 2/2009 | Ritz et al. | |
| 2009/0055911 A1 | 2/2009 | Hulusi et al. | |
| 2009/0058594 A1 | 3/2009 | Nakagawa et al. | |
| 2009/0082015 A1 | 3/2009 | Ravi et al. | |
| 2009/0096623 A1 | 4/2009 | Roosli | |
| 2009/0119698 A1 | 5/2009 | Kuijlaars | |
| 2009/0299777 A1 | 12/2009 | Silberman | |
| 2009/0300988 A1 | 12/2009 | Bem | |
| 2010/0031334 A1 | 2/2010 | Shaikh | |
| 2010/0091968 A1 | 4/2010 | Reid | |
| 2010/0102962 A1 | 4/2010 | Hick | |
| 2010/0198721 A1 | 8/2010 | Caredda | |
| 2010/0216430 A1 | 8/2010 | Brown et al. | |
| 2010/0259388 A1 | 10/2010 | Menzel | |
| 2010/0261465 A1 | 10/2010 | Rhoads et al. | |
| 2011/0053504 A1 | 3/2011 | Corda | |
| 2011/0058657 A1 | 3/2011 | Alegret et al. | |
| 2011/0166995 A1 | 7/2011 | Fuerstenberg et al. | |
| 2011/0181412 A1 | 7/2011 | Alexander et al. | |
| 2011/0187505 A1 | 8/2011 | Faith et al. | |
| 2011/0202181 A1 | 8/2011 | Lee et al. | |
| 2011/0202185 A1 | 8/2011 | Imes et al. | |
| 2011/0223886 A1 | 9/2011 | Nasielski et al. | |
| 2011/0231020 A1 | 9/2011 | Ramachandran et al. | |
| 2011/0254659 A1 | 10/2011 | Bowen et al. | |
| 2011/0271331 A1 | 11/2011 | Adams | |
| 2011/0290893 A1 | 12/2011 | Steinberg | |
| 2011/0314492 A1 | 12/2011 | Cassidy et al. | |
| 2012/0083305 A1 | 1/2012 | Alexander et al. | |
| 2012/0077431 A1 | 3/2012 | Fyke et al. | |
| 2012/0083324 A1 | 4/2012 | Pereaa-OcHoa et al. | |
| 2012/0293301 A1 | 11/2012 | Friedman et al. | |
| 2013/0061303 A1 | 3/2013 | Hart et al. | |
| 2013/0093563 A1 | 4/2013 | Adolfsson et al. | |
| 2014/0096204 A1 | 4/2014 | Hoesl | |
| 2014/0278609 A1 | 9/2014 | Capps | |
| 2015/0040198 A1 | 2/2015 | Gopalakrishnan et al. | |
| 2015/0187151 A1 | 4/2015 | Lagerstedt et al. | |
| 2015/0236857 A1 | 8/2015 | Feltham et al. | |
| 2016/0077532 A1 | 3/2016 | Lagerstedt et al. | |

FOREIGN PATENT DOCUMENTS

| | | |
|---|---|---|
| CN | 101056262 | 10/2007 |
| DE | 4435812 | 2/1996 |
| DE | 10033754 | 1/2002 |
| DE | 10163012 | 7/2003 |
| DE | 20220204 | 4/2004 |
| DE | 202004004351 | 6/2004 |
| DE | 20122249 | 12/2004 |
| DE | 102004013623 | 10/2005 |
| DE | 102004020822 | 10/2005 |
| EP | 0625767 | 11/1994 |
| EP | 0824043 | 2/1998 |
| EP | 1111635 | 6/2001 |
| EP | 1129653 | 9/2001 |
| EP | 1343011 | 9/2003 |
| EP | 1439495 | 7/2004 |
| EP | 1439498 | 7/2004 |
| EP | 1480399 | 11/2004 |
| EP | 1545053 | 6/2005 |
| EP | 1644600 | 4/2006 |
| EP | 1758335 | 2/2007 |
| EP | 1835661 | 9/2007 |
| EP | 1837792 | 9/2007 |

(56) References Cited

FOREIGN PATENT DOCUMENTS

| | | |
|---|---|---|
| EP | 1956450 | 8/2008 |
| EP | 1993065 | 11/2008 |
| EP | 2878142 A2 | 6/2015 |
| GB | 521419 | 5/1940 |
| GB | 623650 | 5/1949 |
| GB | 1214690 | 12/1967 |
| GB | 1243410 | 8/1968 |
| GB | 2339838 | 2/2000 |
| KR | 100736546 | 6/2007 |
| WO | WO 90/13954 | 11/1990 |
| WO | WO 91/07011 | 6/1991 |
| WO | WO 92/006455 | 4/1992 |
| WO | WO 95/003086 | 2/1995 |
| WO | WO 95/022725 | 8/1995 |
| WO | WO 98/012880 | 3/1998 |
| WO | WO 98/026592 | 6/1998 |
| WO | WO 00/21053 | 4/2000 |
| WO | WO 00/038205 | 6/2000 |
| WO | WO 00/043329 | 7/2000 |
| WO | WO 02/07387 | 1/2002 |
| WO | WO 02/059764 | 8/2002 |
| WO | WO 02/060111 | 8/2002 |
| WO | WO 02/065673 | 8/2002 |
| WO | WO 03/006279 | 1/2003 |
| WO | WO 03/023936 | 3/2003 |
| WO | WO 03/024077 | 3/2003 |
| WO | WO 03/096261 | 11/2003 |
| WO | WO 03/096292 | 11/2003 |
| WO | WO 03/105356 | 12/2003 |
| WO | WO 2004/010399 | 1/2004 |
| WO | WO 2004/017621 | 2/2004 |
| WO | WO 2004/028981 | 4/2004 |
| WO | WO 2004/043033 | 5/2004 |
| WO | WO 2004/057851 | 7/2004 |
| WO | WO 2004/066218 | 8/2004 |
| WO | WO 2004/081875 | 9/2004 |
| WO | WO 2004/086675 | 10/2004 |
| WO | WO 2004/102983 | 11/2004 |
| WO | WO 2004/109554 | 12/2004 |
| WO | WO 2004/110083 | 12/2004 |
| WO | WO 2004/114049 | 12/2004 |
| WO | WO 2005/004420 | 1/2005 |
| WO | WO 2005/073742 | 8/2005 |
| WO | WO 2005/079517 | 9/2005 |
| WO | WO 2005/079536 | 9/2005 |
| WO | WO 2005/079539 | 9/2005 |
| WO | WO 2005/081189 | 9/2005 |
| WO | WO 2005/081561 | 9/2005 |
| WO | WO 2005/109668 | 11/2005 |
| WO | WO 2005/109669 | 11/2005 |
| WO | WO 2006/009973 | 1/2006 |
| WO | WO 2006/015473 | 2/2006 |
| WO | WO 2006/018369 | 2/2006 |
| WO | WO 2006/020125 | 2/2006 |
| WO | WO 2006/021592 | 3/2006 |
| WO | WO 2006/022910 | 3/2006 |
| WO | WO 2006/067271 | 6/2006 |
| WO | WO 2006/072617 | 7/2006 |
| WO | WO 2006/093771 | 9/2006 |
| WO | WO 2006/093772 | 9/2006 |
| WO | WO 2006/093773 | 9/2006 |
| WO | WO 2006/101614 | 9/2006 |
| WO | WO 2006/101615 | 9/2006 |
| WO | WO 2008/019942 | 2/2008 |
| WO | WO 2008/024306 | 2/2008 |
| WO | WO 2008/024985 | 2/2008 |
| WO | WO 2008/025007 | 2/2008 |
| WO | WO 2008/027830 | 3/2008 |
| WO | WO 2008/046365 | 4/2008 |
| WO | WO 2008/048933 | 4/2008 |
| WO | WO 2008/052178 | 5/2008 |
| WO | WO 2008/115184 | 9/2008 |
| WO | WO 2008/121181 | 10/2008 |
| WO | WO 2008/144488 | 11/2008 |
| WO | WO 2009/018215 | 2/2009 |
| WO | WO 2011/121299 | 10/2011 |
| WO | WO 2011/149600 | 12/2011 |
| WO | WO-2014016705 A2 | 1/2014 |
| WO | WO-2014016705 A3 | 10/2014 |

OTHER PUBLICATIONS

Brogan "Samsung Galaxy S III Holiday Inn app offers remote hotel Olympic experience," Pocket-lint, Jul. 25, 2012, 5 pages [retrieved from: http://www.pocket-lint.com/news/116433-samsung-galaxy-s-iii-holiday-inn-olympic-app].

Extreme Sensors, "Sensor Networks Make Early Inroads" retrieved from internet site http://www.extremesensors.com/print_article/Sensor+Networks+Make+Early+Inroads/1411 . . . on Sep. 6, 2006, 6 pages.

Ember Corporation, "Easy ZigBee on track with Telegesis and Ember" Feb. 1, 2006, 3 pages.

International Search Report and Written Opinion for International (PCT) Patent Application No. PCT/IB2013/002110, dated Jan. 21, 2014 9 pages.

International Preliminary Report on Patentability for International (PCT) Patent Application No. PCT/IB2013/002110, dated Feb. 5, 2015 6 pages.

International Search Report and Written Opinion for International (PCT) Patent Application No. PCT/IB2013/002379, dated Jul. 11, 2014 16 pages.

International Preliminary Report on Patentability for International (PCT) Patent Application No. PCT/IB2013/002379, dated Feb. 5, 2015 10 pages.

International Search Report and Written Opinion for International (PCT) Patent Application No. PCT/IB2013/002144, dated Jan. 22, 2014 9 pages.

International Preliminary Report on Patentability for International (PCT) Patent Application No. PCT/IB2013/002144, dated Feb. 5, 2015 6 pages.

Official Action for U.S. Appl. No. 14/417,645, dated Mar. 27, 2017 7 pages Restriction Requirement.

Official Action for U.S. Appl. No. 14/417,645, dated Jun. 20, 2017 9 pages.

Official Action for U.S. Appl. No. 14/417,645, dated Nov. 27, 2017 6 pages.

Notice of Allowance for U.S. Appl. No. 14/417,645, dated Feb. 21, 2018 5 pages.

Official Action for European Patent Application No. 13794.973.1, dated Jul. 19, 2016 9 pages.

Official Action for European Patent Application No. 13794.973.1, dated Apr. 17, 2018 4 pages.

"U.S. Appl. No. 14/417,645, Preliminary Amendment filed Jan. 27, 2015", 3 pgs.

"U.S. Appl. No. 14/417,645, Preliminary Amendment filed Feb. 13, 2015", 9 pgs.

"U.S. Appl. No. 14/417,645, Response filed May 23, 2017 to Restriction Requirement dated Mar. 27, 2017", 2 pgs.

"U.S. Appl. No. 14/417,645, Response filed Sep. 19, 2017 to Non Final Office Action dated Jun. 20, 2017", 15 pgs.

"U.S. Appl. No. 14/417,645, Response filed Dec. 7, 2017 to Final Office Action dated Nov. 27, 2017", 7 pgs.

"European Application Serial No. 13794973.1, Communication Pursuant to Article 94(3) EPC dated Apr. 17, 2018", 4 pgs.

"European Application Serial No. 13794973.1, Communication Pursuant to Rule 164(2)(b) and Article 94(3) EPC dated Jul. 19, 2016", 10 pgs.

"European Application Serial No. 13794973.1, Response filed Oct. 15, 2018 to Communication Pursuant to Article 94(3) EPC dated Apr. 17, 2018", 23 pgs.

* cited by examiner

CONTROLLING AN OPERATING CONDITION OF A THERMOSTAT

CROSS-REFERENCE TO RELATED APPLICATIONS

This application is a continuation of U.S. patent application Ser. No. 14/417,645, filed Jan. 27, 2015, which is a national stage application under 35 U.S.C. 371 of PCT Application No. PCT/IB2013/002379 having an international filing date of Jul. 26, 2013, which designated the United States, which PCT application claimed the benefit of U.S. Provisional Patent Application No. 61/676,728, filed Jul. 27, 2012, each of which is incorporated by reference in its entirety.

FIELD OF THE DISCLOSURE

The present disclosure relates generally to energy management and security systems, devices, and methods particularly well suited for use in multi-room facilities.

BACKGROUND

The energy management of multi-room, or multi-suite, facilities such as hotels, apartment buildings, office complexes, dormitories, office buildings, classrooms, cruise ships, laboratory facilities, and similar structures is complex and demanding. Specifically, the unique demands associated with multi-room facilities, including facility security, facility operational efficiency, and facility maintenance, can contribute to high operational costs for the typical facility operator. As multi-room facilities increase in size so do the costs associated with facility management and maintenance.

In a hotel, for example, individual rooms utilize devices/elements such as doors, electronic locks, Do Not Disturb (DND) devices, lights, heating, ventilation, and air conditioning (HVAC), safe, minibar, draperies, maid communication devices, room occupancy detection and communication, and more and all have a potentially high impact on the hotel operation (particularly the operating costs) as well as guest comfort.

Many building owners, including the owners of apartments, offices and hotels, continue to seek methods to decrease their HVAC expenses. One method to do so is to select minimum and maximum setback temperatures for a room, which require less operation of the room's HVAC equipment, when the room is not occupied. This method requires an accurate occupancy sensor.

In the past, motion detectors have been used as occupancy sensors in rooms. In particular, infrared motion detectors have been used. An infrared motion detector typically measures persons or objects that are both 1) showing a selected surface temperature difference from that of the room and 2) moving at a selected speed.

However, the use of a motion detector as an occupancy sensor does not produce an accurate indication of a room being occupied in situations in which an occupant remains motionless for an extended period of time, such as in sleeping, reading or watching television. The motion detector is also not accurate in rooms in which the geometry of the room includes blind spots to the motion detector such as alcoves or bathrooms.

Moreover, the use of motion detectors may be capable of differentiating between a general state of occupancy associated with a room, but they are incapable of determining a general or specific location of the occupant after the occupant has left the room. As such, the typical multi-room facility operator cannot make use of more efficient energy management techniques and deeper setback controls to save the wasted energy consumption costs associated with an unoccupied room.

SUMMARY

It is, therefore, one aspect of the present disclosure to provide a more intelligent mechanism for managing the operations of a multi-room facility. More specifically, embodiments of the present disclosure provide methods, systems, and devices for determining occupancy states of a room, or collection of rooms, based at least in part on a location of a mobile device associated with the room or collection of rooms. In accordance with at least some embodiments of the present disclosure, the occupancy state of a room or collection of rooms may be determined by analyzing a combination of a door state, motion activity within the room or rooms, and/or a mobile device location. Once a room occupancy state is determined, certain room functions may be controlled to conserve energy.

Embodiments of the present disclosure provide a setback controls system to control the in-room energy consumption based on detecting the location of an occupant in relation to the room. It can be offline (in-room only) or as a part of an online system using online device networks such as those described in U.S. patent application Ser. No. 11/872,549 to Alexander et al., and U.S. patent application Ser. No. 12/691,862 to Alexander et al., the entire contents of which are incorporated herein by reference for all that they teach and for all purposes. In some embodiments of the present disclosure, components of the setback controls system comprise one or more of an intelligent thermostat module, a motion sensor which may also have some built in intelligence, a mobile device which may have some built-in intelligence, a software system for controlling the transmission of a message between the setback controls system and the mobile device, a software system for controlling the transmission of a message throughout the multi-room facility, and service terminal software for a handheld programmer unit, which may also be referred to as a service terminal. The online system may utilize existing gateways and, if needed, existing routers of a lock network. In some embodiments, these gateways are outside of the room and receive data wirelessly from several rooms and convert it to network data, usually in the form of a TCP/IP packet.

In accordance with at least one embodiment of the present disclosure, the door lock is adapted to send a wireless message to the thermostat controller each time the door is opened, detailing that it is a door open command, opened by key or from the inside, and if by key sends the user type (guest or staff) and expiration date if it is a guest key. The door lock may also send a message when the door is closed.

In some embodiments, the mobile device is configured to send a wireless message to the thermostat controller, setback controls system, or other in-room device or near-room device when the mobile device changes location. This change in location may include moving from one position to another inside a room, outside a room, and/or combinations thereof. Additionally or alternatively, the change in location may be recorded and/or compared to previous location information associated with the mobile device. Among other things, by comparing location positions at different times, the direction of travel of the mobile device may determined. It is an aspect of the present disclosure that location and/or direction of travel may be determined using GPS data, WiFi access point detection, cell tower location and/or combinations thereof in real-time, near-real-time, and/or based on historical data. The location and/or direction of travel may be used to determine the level of setback control to apply to a room or plurality of rooms.

It is an aspect of the present disclosure that the wireless message may be sent by the mobile device automatically or manually. In one embodiment, the wireless message may be sent in response to at least one input received. Various inputs may include one or more request, timer, device state (on, off, sleep, energy-saving mode, etc.), mobile device location, and the like. It may be possible to configure the mobile device to refrain from sending this information more than once in a predetermined time period (e.g., 30 second time period).

In some embodiments, the thermostat controller receives this information and makes determinations of the occupancy of the room. When the door is closed and motion has been sensed, the room enters the Occupied State. Additionally or alternatively, when the mobile device is detected as being inside the room, or in-room, the room may enter the Occupied State. In this state, control of the HVAC system, and in the future other energy consuming devices such as the lighting and TV, will be given to the occupant based on the settings of the thermostat. When the door opens, the thermostat controller will operate based on the set temperature of the unit for a configurable period of time (typically 8 minutes), and will enter or remain in the Unoccupied or Unsold state until a "door closed and motion detected" and/or "mobile device in-room" message is received. If no motion is detected for a configurable amount of time (e.g., 8 minutes), the thermostat controller may control the room based on the energy management settings, not the local settings of the thermostat. Additional features may be included to determine response to conditions when the door is left open, based on if it is an interior corridor door or an exterior door.

In addition to the operational messages, the battery operated devices may also send their battery status information to the thermostat controller.

If no Radio Frequency (RF) door lock is used, the system will monitor the door position using a standard door switch, either wired or wireless. In this scenario, the only information the thermostat controller receives is the door open and door closed status. If wired, such information may be received through a closed loop input.

Embodiments of the present disclosure add the detection of occupants when they use any online devices of the room, such as pressing the buttons of the thermostat, opening or closing the in-room safe or minibar, turning on or off the lights, setting the Do Not Disturb on a separate device or on the door lock. If any of these (or other) devices are used, the setback controls system can determine that a person is inside the controlled space. This feature is especially useful in the event that a mobile device associated with the controlled space belongs to an occupant who has left the space with the mobile device, but other occupants remain in the controlled space. For example, the children of a family may remain in the room of a hotel while the parents attend a party in some other area of the hotel. In this scenario it may not be desired to control the room functions in a setback mode.

In accordance with at least some embodiments of the present disclosure, the state of "door closed", plus any other device being used, means the room is occupied.

It is another aspect of the present disclosure to provide an intruder detection and alert feature. This particular feature is a security alert that can be used in rooms where occupancy determination is present. To use this feature, a motion sensor and online door lock may be employed. As one example, if the inside handle of the door lock is turned, but the room is in the unoccupied state, an alarm is issued to alert security that an under the door tool may have been used to gain access surreptitiously. This alarm can be sounded in a number of methods, including computer screen, email, SMS, buzzer, etc.

It is another aspect of the present disclosure to provide an automated Do Not Disturb (DND) feature. This feature may also be used in a room where occupancy determination is present. In accordance with at least some embodiments of the present disclosure, when the room enters the occupied state, a signal is sent to the door lock to enable the DND feature of the lock without the guest having to do anything.

In another aspect of the present disclosure, a motion only functionality may be utilized whereby occupancy state can be determined without door monitoring. This feature may employ one or more motion sensors and a controller, which may be provided in a thermostat or other central management device. In some embodiments, two time intervals may be defined, a daytime interval and a typically shorter nighttime interval, although the daytime interval may be equal to or shorter than the nighttime interval. In the daytime interval, whenever motion is detected, an energy management system may enter an occupied state for a configurable (customer configuration or administrator configuration) number of minutes, e.g. 15-30. Each time motion is detected, the timer is restarted. When in the nighttime interval, if motion is detected, the energy management system may lock into an occupied state until the daytime interval is reached.

In another aspect of the present disclosure, a mechanism is provided for turning off a motion sensor (e.g., to save batteries) when occupancy of a room is confirmed. When using door monitoring and motion detection for occupancy determination, or in nighttime interval of utilizing motion-only occupancy detection, once occupancy is confirmed by the door being closed and motion sensed, the motion sensor may be turned off until the door has been opened again. By entering this sleep mode, the battery life of the motion sensor will be extended.

It is an aspect of the present disclosure that the setback controls system and/or mobile device are capable of utilizing one or more motion detectors associated with a room, or rooms, to determine the presence of one or more occupants inside a room. Although the one or more motion detectors may be used alone to determine a state of occupancy associated with a room, the present disclosure is directed to the use of mobile devices to provide an accurate room occupancy state and/or occupant location. In some embodiments, the mobile device and the one or more motion detectors may be used in combination by the setback controls system in determining a precise location of an occupant inside a room.

In some embodiments, the energy use and/or energy control of a room may be set to various levels of setback based on the occupancy state of a room and a location of the mobile device associated with the room. A low-level setback may adjust HVAC output by changing the set-point temperature by one or more degrees. On the other hand, a deep-level setback may adjust HVAC output by deactivating the device for a period of time. In the event that an occupant has left a room, the setback controls may be adjusted to a low-level setback, a mid-level set-back, or a deep-level setback. A low-level setback may be initiated where the occupant is expected to return (e.g., based on one or more of location, distance from room, and time away from room) in a short amount of time (e.g., 5 minutes or less). The deep-level setback may be initiated when the occupant is not expected to return to a room for a long period of time (e.g., 2 hours or more). It is an aspect of the present disclosure that the mid-level setback may be initiated for any range in between the low-level and deep-level setback. Furthermore, the setback levels and temperatures associated therewith may be defined by a user (e.g., customer or holder of the mobile device) and/or administratively (e.g., by the hotel staff). In some embodiments, the hotel administration may define an acceptable range of temperatures for one or all conditions and a user may pick a specific temperature within that range of temperatures. Further still, the user may define these temperatures before check-in, during a mobile check-in, or after they have checked-in.

As can be appreciated, the energy control of a room may be returned to an occupied state upon detecting an approaching location and/or condition associated with the mobile device. In other words, the room may be operated in a normal (i.e., non-setback) condition upon detecting that a mobile device is returning to the room. The detection of a mobile device returning to a room may be achieved without detecting presence in the room. It is a feature of the present disclosure that adjustments may be made to the room control without negatively affecting the comfort of the occupant. For instance, the room may be operated in a deep-level setback while the occupant is away from the room for some time, but if it is detected that the occupant is returning to the room, the HVAC and/or other controls may be returned to the room before the occupant arrives. By the time the occupant arrives at the room, the temperature of the room can be returned to the occupied state temperature, and the entire setback control process would be invisible to the occupant.

In some embodiments, the setback controls may be operated in accordance with mobile device location. Among other things, the location and direction of travel of an associated mobile device may be determined by GPS coordinates and data, WiFi access point addresses, and/or Telephony/Cellular location data and/or cell tower use (i.e., Location Information). The mobile device may be equipped with an application that communicates with a setback control system associated with the multi-room facility and/or room. This application may accept requests for position by the setback controls system on a programmed and/or timed basis. For example, an occupant may have a mobile device associated with a room of a multi-room facility. The occupant may decide to leave the room at 9:00 in the morning taking the associated mobile device from the room. Once the occupant has left the room, the setback controls system may determine to start a timer before requesting a first location of the occupant. When the timer expires, the request for occupant location may be sent to the occupant's mobile device. Upon receiving the request, the mobile device accesses its Location Information and sends a message containing at least the occupant's location to the setback controls system for processing. The setback controls system then determines to adjust setback levels of the room based on rules (e.g., distance from room, time away from room, anticipated time to return to the room, habit and/or historical data, user preferences, and more).

It is an aspect of the present disclosure that the occupant's direction of travel may be used to adjust the setback controls. The occupant's direction of travel may be determined in a number of ways including but not limited to determining a first location associated with an occupant at a first time, determining a second location associated with the occupant at a second time, comparing the first location of the occupant to the second location of the occupant, and determining whether the second location of the occupant is further away from a specific point of reference (e.g., the room) or closer to the specific point of reference. In the event that the second location is determined to be further from the specific point of reference, then the occupant may be determined to be traveling away from the room. However, it may be determined that the second location is closer to the specific point of reference and therefore the occupant may be traveling toward the room. It is not necessary, however, that the specific point of reference be the room or multi-room facility. As long as the specific point of reference is known, the computations for determining direction of travel can be adjusted.

It is another aspect of the present disclosure that specific distances from a specific point of reference may be classified as one or more zones. These zones may be used to initiate a response by the setback controls system. For instance, if the occupant described above has been detected as traveling from one zone to another zone, the setback control system may respond by adjusting the setback controls. Additionally or alternatively, if it is detected that an occupant is located within a certain zone, the setback controls system may determine whether to activate setback or not. In some embodiments, the setback controls system may use a combination of Location Information and zones to fine tune a process of room control.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The Summary is neither intended nor should it be construed as being representative of the full extent and scope of the present disclosure. The present disclosure is set forth in various levels of detail and the Summary as well as in the attached drawings and in the detailed description of the disclosure and no limitation as to the scope of the present disclosure is intended by either the inclusion or non inclusion of elements, components, etc. in the Summary. Additional aspects of the present disclosure will become more readily apparent from the detailed description, particularly when taken together with the drawings.

DETAILED DESCRIPTION

Embodiments of the present disclosure are directed toward devices and methods of using such devices in a wireless network. Although well suited for use in systems and methods employing RF communication protocols, such as the ZigBee protocol, embodiments of the present disclosure may be suitable for use in systems employing other low power consumption communication protocols including, without limitation, wireless USB, Z-Wave, and variations of the ZigBee protocol known and not yet developed.

Figure 1:
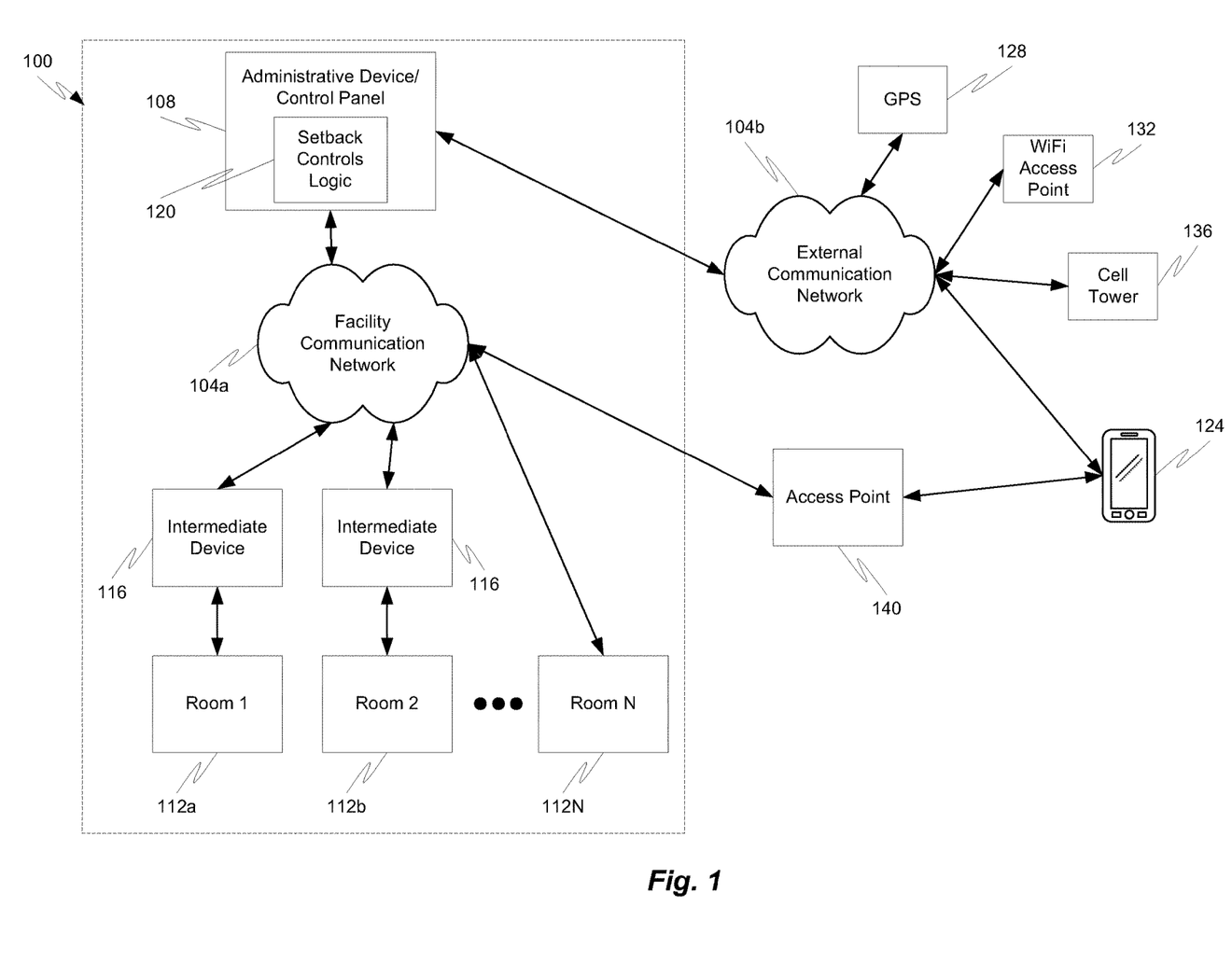
FIG. 1 is a block diagram depicting a multi-room facility and mobile device communication in accordance with embodiments of the present disclosure.

Referring initially to FIG. 1, an exemplary multi-room, or multi-unit, facility 100 and mobile device 124 communication will be described in accordance with at least some embodiments of the present disclosure. The multi-room facility 100 includes a plurality of rooms 112a-N. The energy consumption and/or security of such rooms 112a-N may be controlled at an administrative device/control panel 108. The control panel 108 may comprise setback controls logic 120 for implementing the energy management and other features provided herein. The setback controls logic 120 may be provided in the form of instructions stored in computer memory that, when executed by a processor, perform one or more methods described herein. In some embodiments the control panel 108 may be co-located in the same building or complex as the rooms 112. In other embodiments, the control panel 108 may be remote from the building or complex having the rooms 112.

In either instance, the rooms 112, or more specifically devices within or associated with the rooms 112, may be adapted to communicate with the control panel 108 via a communication network 104. In some embodiments, the rooms 112 may be connected directly to the facility communication network 104a while other rooms 112 may be connected to the facility communication network 104a via an intermediate device. Exemplary configurations of such a communication network are described in more detail in U.S. patent application Ser. No. 11/872,549, the entire contents of which are hereby incorporated herein by reference.

In some embodiments, at least one mobile device 124 may be associated with one or more rooms 112. This association may be provided via an active or passive registration process as described herein. It is an aspect of the present disclosure that the mobile device 124 may provide detailed location information to the control panel 108. This location information may be used by the setback controls logic 120 to determine an appropriate energy management control for the room 112 associated with the mobile device 124. Location information may correspond to a position of the mobile device 124 relative to a position of the facility 100 and/or at least one room 112.

The location information of a mobile device 124 may be provided via information from one or more of Global Positioning System (GPS) data, WiFi or Wireless Local Area Network (WLAN) data, cellular data, and/or other features used by mobile devices 124. This data may be obtained by the mobile device 124 accessing one or more communication networks 104a, 104b. Several mobile device 124 and smart-phone manufacturers allow access to location services for location-aware applications. Some of these manufacturers provide the ability to deactivate location service permissions for one or more applications installed on a mobile device 124. In accordance with aspects of the present disclosure, the mobile device 124 may send location information obtained from at least one of GPS 128, WiFi Access Point 132, and Cell Tower 136 to the control panel 108 where setback controls are managed in accordance with controls logic 120.

Although depicted outside of the multi-room facility 100, in some embodiments, the mobile device 124 may be located inside a room 112 and/or facility 100. Moreover, the mobile device 124 may communicate with the multi-room facility 100 via a path through an access point 140 and facility communication network 104a and/or via an alternate path through an external communication network 104b and the control panel 108. The access point may be located internal or external to the multi-room facility 100.

Figure 2:
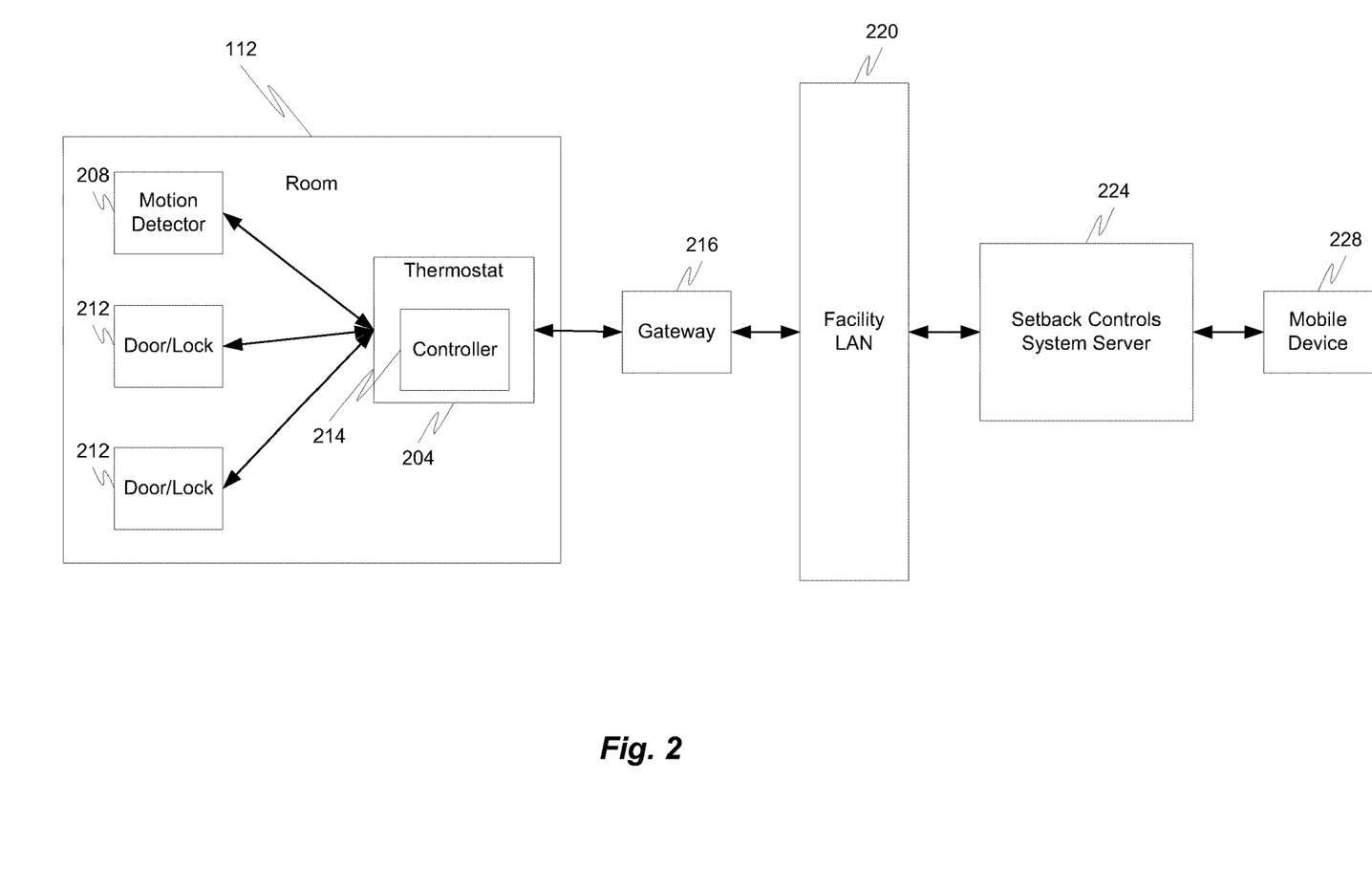
FIG. 2 is a block diagram depicting a setback control system in accordance with embodiments of the present disclosure.

FIG. 2 depicts further details of the various devices within a room 112 that can be configured to communicate with a centralized management device, such as a setback controls system server 224. More specifically, one or more rooms 112 within a multi-unit facility 100 may be provided with a plurality of devices, some of which communicate with each other and others of which communicate with the setback controls system server 224. In accordance with at least some embodiments of the present disclosure, a room 112 may comprise a thermostat 204, a motion detector 208 (e.g., an infrared motion detector, an RF device for detecting an RFID being carried by a user, or any other device capable of detecting the presence of one or more persons within a controlled space), and one or more doors each having one or more locks 212. Other types of in-room devices may include a minibar, an in-room safe, a telephone, a clock, a television, a radio, a computer, lights, fans, air conditioning units, heaters, RJ-45 connection port, etc.

In the depicted embodiment the thermostat 204 may include a controller 214 for implementing one or more setback control methods described herein. The controller 214 may also be adapted to facilitate communications between the thermostat 204 and the other in-room devices 208, 212 as well as out of room devices, such as a gateway 216 (which is but one example of an intermediate device 116). In some embodiments a single gateway 216 may be in communication with a plurality of different rooms 112 via their respective controllers 214. The messages exchanged between the controller 214 and these other devices may be utilized to facilitate efficient and low-cost methods for managing the room 112. In other embodiments, a gateway 216 may comprise a controller for a plurality of rooms 112. Is some embodiments, control functionality may be split between multiple in-room and/or out-of-room devices.

In addition to receiving and sending messages as described above, the controller 214 may also be adapted to send messages, such as control messages, to in-room devices and/or mobile devices 124. As one example, the controller 214 may implement an automated DND feature whereby the controller 214 sends a message (either via a wired or wireless communication medium) to one or both of the doors/locks 212 instructing the doors/locks 212 to enter the DND mode when the room 112 is occupied. It should be noted that this particular feature may be user configurable and, once configured, easily and automatically executed by the controller 214. As another example, the controller 214 may implement battery saving features by sending messages to various in-room devices, such as the motion detector 208, instructing the motion detector to enter a sleep mode until activity is detected at one of the doors/locks 212. In yet another example, the controller 214 may be configured to send a message to an associated mobile device 124 regarding setback control decisions.

In accordance with at least some embodiments of the present disclosure, the controller 214 may also be adapted to send periodic status messages as well as messages reporting any in-room or room-related events (e.g., door messages, motion messages, occupied states, temperatures, runtime calculations, alarms, maintenance intervals, etc.) to the gateway 216. The gateway 216 is then configured to generate a message for transmission to the setback controls system server 224 and/or the mobile device 124 via the facility Local Area Network (LAN) 220. It should be appreciated by those skilled in the art even though the communication network between the gateway 216 and setback controls system server 224 is depicted as a LAN 220, any other type of communication network or collection of communication networks may also be employed without departing from the scope of the present disclosure. For example, a WAN, cellular network, SMS network, CDMA network, TCP/IP network, or any other type of communication network may be used in addition to or in lieu of the LAN 220.

Although not depicted, the controller 214 may also be capable of performing traditional thermostat functions, such as controlling HVAC operations. Those skilled in the art will appreciate that the thermostat 204 may be connected to an HVAC system via a wired or wireless communication medium. The operation of the HVAC system may be managed by the controller 214 based on inputs received at the controller from the various in-room devices as well as based on instructions received from the setback controls system server 224.

In accordance with at least some embodiments of the present disclosure, the thermostat 204 may be the only device provided with the controller 214 and, therefore, may be the device responsible for coordinating the communications within the room 112 and throughout the facility 100. In other embodiments, the controller 214 may be provided in the motion detector 208 or one of the doors/locks 212. In other embodiments, two or more devices within or associated with a room 112 may be provided with a controller 214. In such a configuration, the multiple controllers 214 may be configured to share the controlling responsibilities as well as facilitate communications. Multiple controllers 214 may also be useful in situations where it is desirable to avoid a single point of failure. Specifically, a first controller 214 in the room 112 may be the primary controller 214 responsible for performing all controlling activities and a second controller 214 in the room 112 may be the room's backup controller that is only activated when the primary controller 214 has a failure or otherwise becomes unable to perform its controlling duties. Additionally or alternatively, one or more mobile devices 124 associated with the room 112 may be provided with a controller 214.

Figure 3:
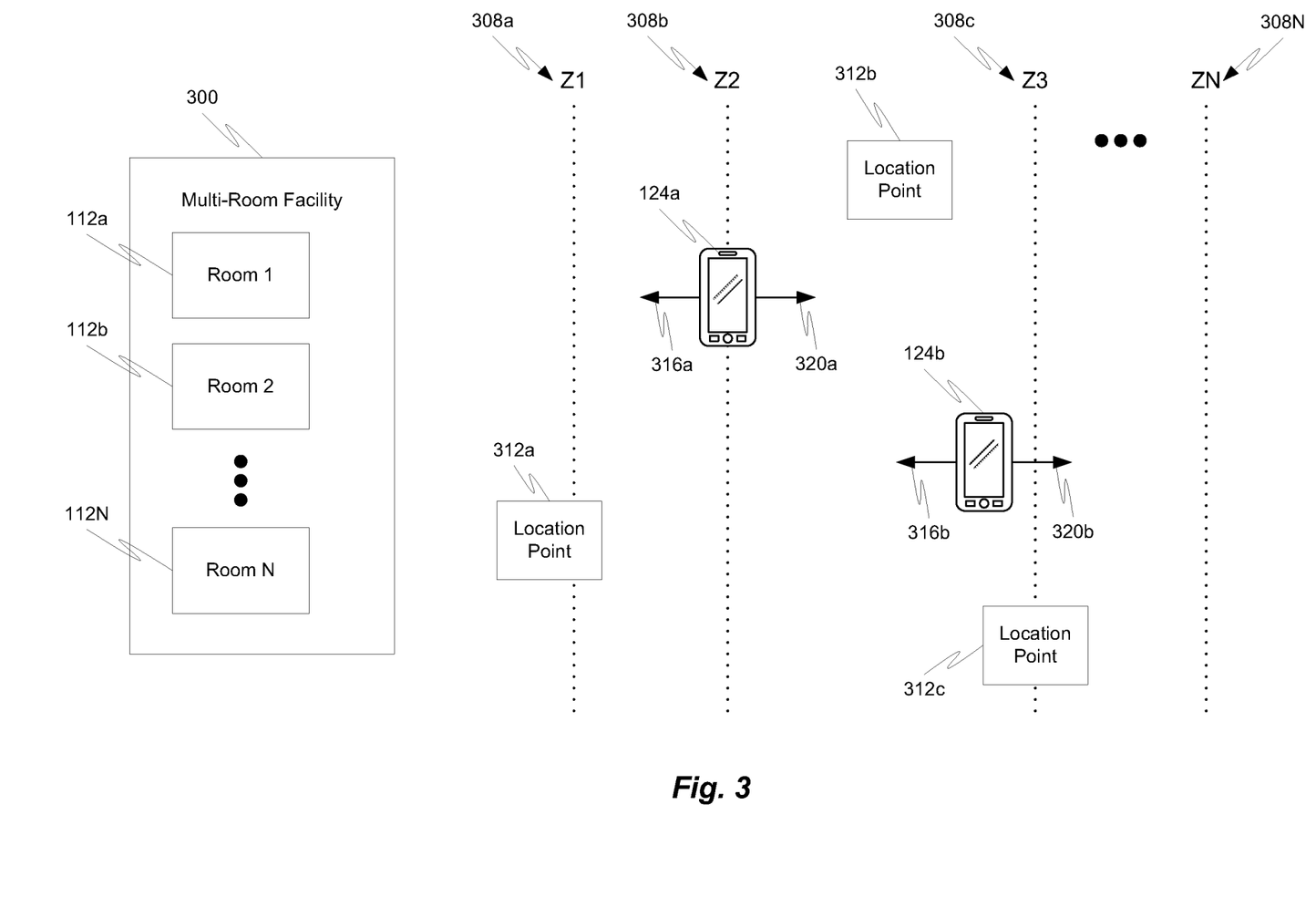
FIG. 3 is a block diagram depicting a mobile device location system for communication with a setback control system of a multi-room facility in accordance with embodiments of the present disclosure.

With reference now to FIG. 3, a mobile device 124 location system for communication with a setback controls system of a multi-room facility 300 will be described in accordance with at least some embodiments of the present disclosure. As previously disclosed, the facility 300 includes a plurality of rooms 112a-N. In some embodiments, one or more mobile devices 124a-b may be associated with one or more of the rooms 112. These mobile devices 124a-b may provide location information to the facility 300 that can be used by the setback controls system server 224 and/or setback controls logic 120 (see FIG. 1) to determine an energy management scheme, including a setback control, of one or more rooms 112.

It is an aspect of the present disclosure that a mobile device 124 may provide location information by sending a message to at least one administrative device 108, 224 associated with the facility 300 for setback control interpretation. The message may contain general or specific location information of the mobile device 124. For instance, a room 112 may have varying levels of energy setback that are at least partially dependent on the time that an occupant may be away from the room 112. A deeper setback level may be employed when an occupant is not expected to return to the room 112 for a longer period of time. On the other hand, lower levels of setback may be employed if it is determined that an occupant may return to the room 112 in a shorter period of time. The time that an occupant is away from the room 112 may be determined at least from a general distance that the mobile device 124 has traveled from the facility 300 and/or room 112. In some embodiments, the general distances may be established by the use of one or more zones 308a-N as described herein. Moreover, the message may indicate a direction of travel, and even rate of travel, associated with the mobile device 124.

In some embodiments, the location information associated with a mobile device 124 may be obtained from one or more location points 312a-c. It is anticipated that the one or more location points 312 may include at least one GPS satellite 128, WiFi access point 132, cellular tower 136, equivalents thereof, and the like. The location of a mobile device 124 may be provided by one or more methods using trilateration, physical device address, device Internet Protocol (IP) address, triangulation, and other location determination techniques.

It is an aspect of the present disclosure that an administrative device 108, 224 may request location information messages from a mobile device 124 and/or receive location information messages from a registered mobile device 124. The administrative device 108, 224 may initiate the request via one or more programmed conditions. For instance, a request may be sent from the administrative device 108, 224 in the event that a door/lock 212 and/or motion detector 208 signal of a room 112 is detected. This request may be made to verify the location of the mobile device 124 associated with the occupant in accordance with rules. In this scenario, if it is determined that the occupant is located away from the room 112 an alarm and/or security notification may be sent to a third party, another device, the occupant, the mobile device 124, and/or combinations thereof. Additionally or alternatively, the administrative device 108, 224 may send one or more location information request based on a timer. This request timer may be initiated by the administrative device 108, 224, a third party, some other device, and/or the mobile device 124. In some instances, the request timer, may be initiated when the mobile device 124 leaves a room 112.

It is another aspect of the present disclosure that the mobile device 124 may send location information messages to the administrative device 108 without requiring a request from the administrative device 108, 224. For example, a mobile device 124 may send location information to the administrative device 108, 224 after a message timer has elapsed. In some instances, the message timer may be initiated when the mobile device 124 leaves a room 112. Additionally or alternatively, the mobile device 124 may send one or more location information messages upon determining that the mobile device 124 has entered into and/or passed by a specific zone 308.

Determining the location of the mobile device 124 and/or the zone 308 location of the mobile device 124 may be achieved via use of location points 312. In general, the mobile device 124 may include a location application that is configured to monitor and/or track location at various time intervals. Specifically, the location application is configured to have access to one or more of GPS, WiFi, and Cellular features associated with the mobile device 124. Moreover, the location application may run in the background of other applications and operating systems that are a part of the mobile device 124. It is anticipated that the location application is capable of using one or more of the location information features to determine location of the mobile device 124 at any given time. In some embodiments, the mobile device 124 may use GPS features to request a position by using location points 312, which may be one or more GPS satellites, to retrieve global coordinates associated with of the mobile device 124. Additionally or alternatively, the mobile device 124 may utilize WiFi access points to determine position, where the access points are represented by the location points 312 in FIG. 3. By detecting the IP address of one or more WiFi access points, the mobile device 124, in conjunction with a Geo-IP location database (e.g., IP address map lookup service), can determine a general or specific location of the mobile device 124. Similarly, cell tower data may be used by the location application to determine the mobile device 124 location. Refined location information may be gathered by the location application utilizing the signal strength of location points 312, multiple location services, and the like.

In some embodiments, a direction of travel 316, 320, and even rate of travel, associated with the mobile device 124 may be determined from multiple location information samples taken at different times. The direction of travel 316, 320 may be determined by the location application and/or the administrative device 108, 224 using location information from the mobile device 124. In general, a first location information of a mobile device 124 may be determined at a first time, a second location information of the mobile device 124 may be determined at a second time, the first location information may be compared to the second location information, and based on the comparison a direction of travel 316, 320 may be determined. If the first location and the second location is the same, the samples may be taken again after a period of time has passed. This sampling period may be configured to increase or decrease depending on rules. Additionally or alternatively, the direction of travel 316, 320 may be determined by detecting a change in zone 308 from one time to another.

By way of example, mobile device 124a may be associated with a first room 112a of the multi-room facility 300. Moreover, the mobile device 124a may be moving in a direction away 320a from the multi-room facility 300. In this case, a first location information determination (L1) may be made at a first point in time (T1). After a period of time has passed (e.g., 2 minutes), a second location information determination (L2) may be made at a second point in time (T2). Comparing L1 to L2, can provide a general direction of travel 316, 320 of the mobile device 124. For instance, the direction of travel 316, 320 of a mobile device 124 can be measured to and/or from the multi-room facility 300. In one embodiment, the location (L0) of the multi-room facility 300 is known and can be used in the comparison of L1 to L2. In this example, L2 is a greater distance away from L0 than L1, so the mobile device 124 can be determined to be moving in a direction away 320a from the multi-room facility 300. It is anticipated that a number of calculations may be used to determine direction of travel 316, 320 of a mobile device 124.

The rate of travel of a mobile device 124 may also be determined using the location information and sampling period described above. In one embodiment, the difference between L1 and L2 measured as an absolute distance (D) may be divided by the time (T) between location information determination points (T2-T1) to provide an average rate of travel associated with the mobile device 124. In some embodiments, the measurements of direction and rate may be determined using alternative methods. As previously stated, the rate of travel, and even location, of the mobile device 124 may be used by the administrative device 108, 224 in determining the timing associated with various setback controls.

It is anticipated that the transmission of location and/or tracking information sent between a mobile device 124 and an administrative device 108, 224 may be secured to prevent unintended uses beyond those disclosed herein. In some embodiments, the messages sent between the mobile device 124 and any other device may be encrypted. Additionally or alternatively, it is anticipated that the data, if intercepted, may only provide a location of a mobile device 124 and a unique identifier associated with the mobile device 124. In other words, the unique identifier may be coded to a memory location in memory associated with the multi-room facility 300 where occupant data may only be obtained when the memory location of the unique identifier is referenced by the administrative device 108, 224. This unique identifier may be assigned by the location application and/or the administrative device 108, 224 of the multi-room facility 300 upon registration and/or installation of the location application.

Figure 4:
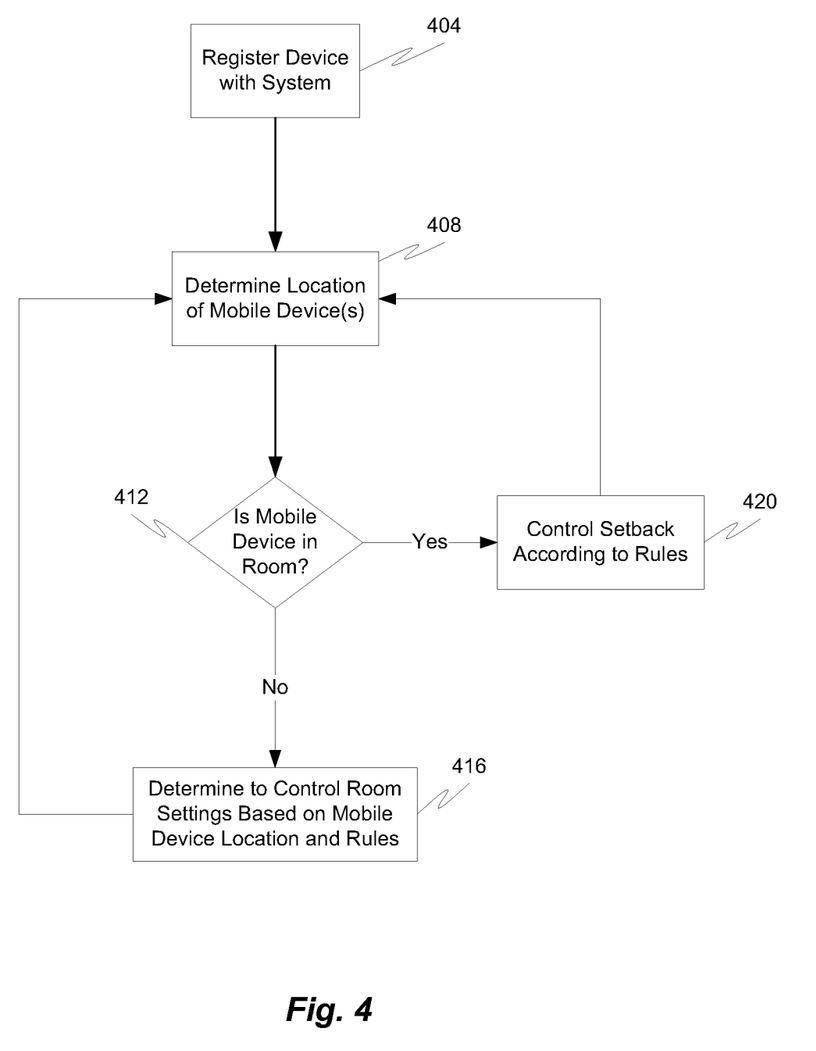
FIG. 4 is a flow diagram depicting a method of determining a location of at least one mobile device in controlling room settings in accordance with embodiments of the present disclosure.

Referring to FIG. 4, a flow diagram depicting a method of determining a location of at least one mobile device 124 in controlling room 112 settings is shown in accordance with embodiments of the present disclosure.

The method begins by registering a mobile device 124 with the setback controls system server 224 (step 404) of a multi-room facility 300. Registration may be achieved by installing at least one application (e.g., location application) on the mobile device 124. The at least one application may include software to determine an identification of the mobile device 124 and associate that identification with one or more assets of the multi-room facility 300 such as a room 112. It is an aspect of the present disclosure that the software may associate the mobile device 124 by a unique identifier generated by the mobile device 124 and/or administrative device 108, 224. Additionally or alternatively, the registration of the mobile device 124 may be achieved by registering the mobile device 124 with a location services server of the multi-room facility 300. The location services server may utilize one or more of an email, phone number, and device ID associated with the mobile device 124. In some embodiments, the location services server may be a part of the setback controls system server 224 and/or the administrative device 108. It is anticipated that the registration of a mobile device 124 may be programmed to expire after a preset period of time. Additionally or alternatively, the registration of a mobile device 124 may be revoked by administrative policy, override, and/or misuse.

The method continues by determining the physical location of the registered mobile device 124 (step 408). As described herein, the location of the mobile device 124 may be determined by one or more of GPS, WiFi, and Cellular data. Additionally or alternatively, the mobile device 124 may be detected by devices that are part of the multi-room facility 300 including but not limited to a door/lock 212, gateway 216, facility LAN 220, setback controls system server 224, and combinations thereof.

In some embodiments, the mobile device 124 may be detected inside a room 112 of a multi-room facility 300 (step 412). As can be appreciated, different setback controls may be initiated if the mobile device 124 is found in an unassociated room 112 versus if the mobile device 124 is detected in an associated (and registered) room 112. For example, a room 112 may be operated in a setback condition if the mobile device 124 is determined to be in an unassociated room 112. The conditions that govern these setback controls may be stored as rules that can be accessed by the setback controls system server 224 (step 420). For example, the rules may determine to delay setback for the room 112 until it has been established that the mobile device 124 is outside of the room 112. Additionally or alternatively, rules may direct the setback controls system server 224 to delay a given time period before determining the location of the mobile device 124 again. These rules may be stored locally and/or remotely from the multi-room facility 300.

In the event the mobile device 124 is determined to be located outside of a room 112, especially an associated room 112, the method continues by determining setback controls for the room 112 (step 416). In some embodiments, the setback controls may be initiated or adjusted based on the location of the mobile device 124 from the room 112. It is an aspect of the present disclosure that specific distances locations, and/or zones that represent a distance, or set of distances, from a known point (e.g., the multi-room facility 300) may be used to initiate and/or adjust setback controls. For example, a mobile device 124 may be determined to be in a zone that is closest to the facility 300 and, as a result, the setback controls may be returned to an occupied (or non-setback) state. Alternatively, the mobile device 124 may be determined to be in a zone furthest from the facility 300 and, as a result, the setback controls may be configured to operate in a deep-level setback condition.

Additionally or alternatively, the setback controls may be initiated or adjusted based on calendar events stored in an application on the mobile device 124. For example, when the mobile device 124 is registered with the facility 300, the facility 300 and/or location application may be granted permissions to check calendar information used by the mobile device 124. This calendar information may be stored locally or remotely from the mobile device 124. It is anticipated that the setback controls system server 224 may make use of calendar data to initiate, adjust, and/or terminate setback controls for a room 112. Specifically, the calendar information may be accessed and features associated with one or more events on the calendar may be recorded. For instance, the calendar may be examined to determine if an event occurs within a twenty-four hour period. If an event is detected, features of the event including but not limited to time, location, and duration may be used to set control periods for setback controls. If no event is detected, a timer may be initiated to recheck the calendar information for new events in a specific time period. This recheck may be initiated by detecting that the user of a mobile device 124 is entering data into a calendar application on the mobile device 124.

In other embodiments, the setback controls may be initiated or adjusted based on a state associated with the mobile device 124. For instance if there is no response from the associated device 124, it may be assumed that the device 124 has lost power, signal, or both. In this scenario, the setback controls may be adjusted to a minimum (i.e., not deep-level) setback.

It is an aspect of the present disclosure that the setback controls may be initiated, adjusted, or terminated based on input received from the mobile device 124. This input may be provided manually, via an operator or occupant associated with the mobile device 124. Alternatively or additionally, the input may be provided automatically in response to conditions. These conditions may include default settings, timers, state of the mobile device 124 and the like. In one embodiment, the administrative device 108, 224 of a facility 300 may send a message to the mobile device 124 corresponding to information about the control of energy associated with the room 112. For example, the administrative device 108, 224 may send a message, in response to a condition, that the room 112 associated with the mobile device 124 is about to be operated in a deep-level, or unoccupied, setback state. The condition may be related to one or more of mobile device 124 physical location, mobile device 124 state, timer, administrative request, facility 300 state, operator, or occupant request, and the like. The mobile device 124 may be presented with options to control the setback level. In this case, the options may appear as "Ignore," "Accept," or "Deny." If the operator, or occupant, selects the "Ignore" option, the administrative device 108, 224 may proceed according to rules and even initiate deep-level setback. The rules may be such that an "Ignore" input causes the administrative device 108, 224 to resend the control option message. Alternatively, an "Ignore" selection may initiate a timer before initiating deep-level setback in this case. An "Accept" selection may perform similarly to the "Ignore" selection behavior. On the other hand, if the "Deny" selection is made, the administrative device 108, 224 may respond by ceasing to initiate deep-level setback controls. It is anticipated that a timer may be started to resend the setback control message after a period of time. In some cases, the operator may initiate the setback controls without a message from the administrative device 108, 224. In some embodiments, no option may be selected, in which case, the administrative device 108, 224 continues according to rules.

Once the setback controls have been initiated and/or adjusted based on rules, the method may continue by determining the location of the mobile device 124 after a period of time. This period of time may be increased or decreased depending on one or more of the time of day (e.g., night v. day), state of the device 124 (e.g., on, off, no signal), state of the multi-room facility 300 (fire, emergency, power outage, etc.), and status of the mobile device 124 association with the facility 300.

Figure 5:
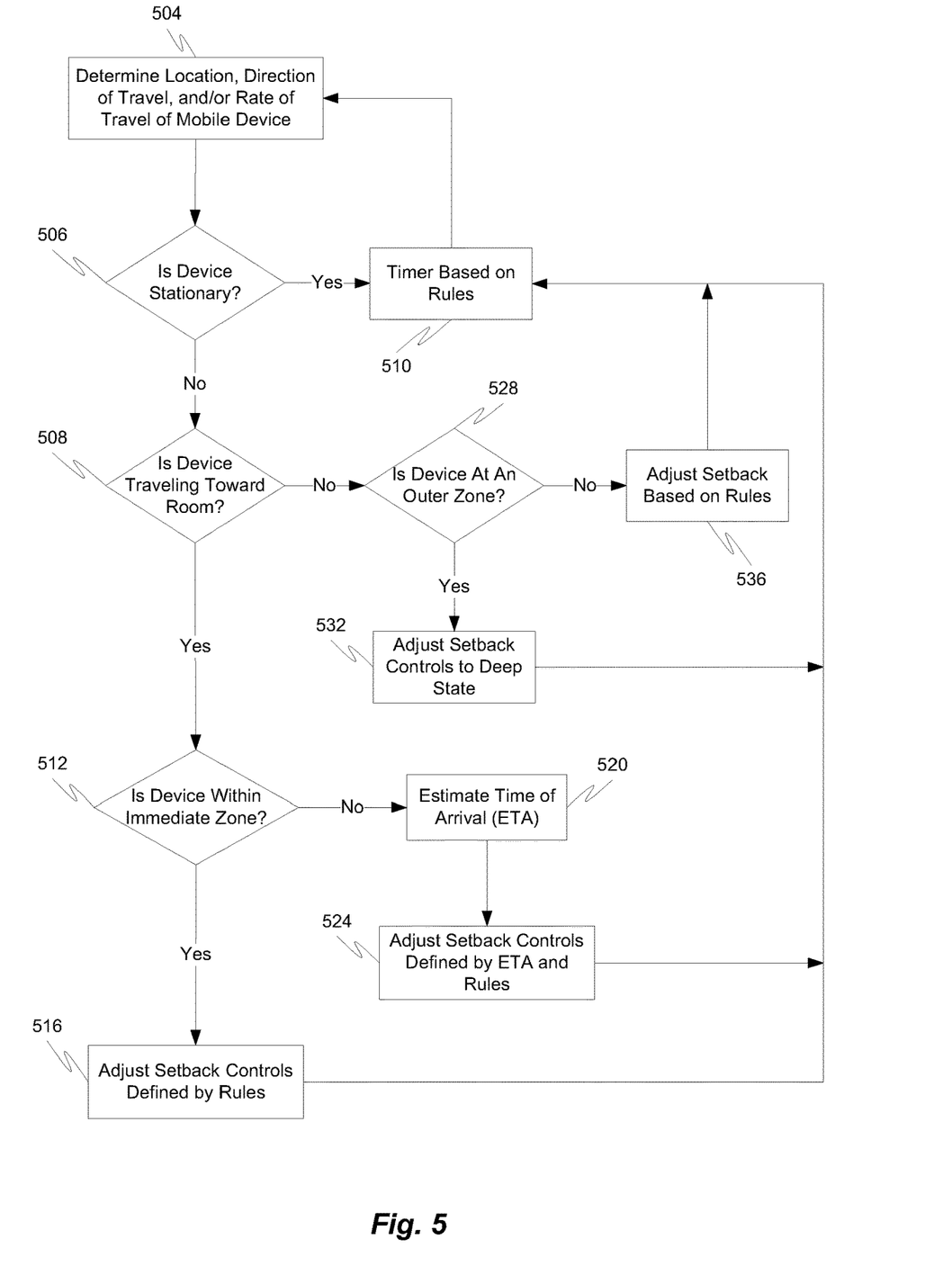
FIG. 5 is a flow diagram depicting a method of providing setback controls based on the location, direction of travel, and rate of travel of a mobile device in accordance with embodiments of the present disclosure.

FIG. 5 is a flow diagram depicting a method of providing setback controls based on the location, direction of travel, and rate of travel of a mobile device 124 in accordance with embodiments of the present disclosure. The method begins by determining the location, direction, and/or rate of travel of the mobile device 124 (step 504). In some embodiments, this determination may involve making multiple location information queries, or samples, at different time intervals. It is anticipated that the accuracy of travel direction and/or rate of travel of the mobile device 124 may be increased by increasing the number of samples taken. Furthermore, the time intervals between samples may be decreased to yield accurate and even instantaneous information associated with the mobile device 124.

Next, the direction of travel must be evaluated in relation to the room 112 and/or multi-room facility 300 (step 508) based on two or more location information determinations made at step 504. In general, the mobile device 124 may be stationary, traveling toward, or traveling away from the room 112. For example, it may be determined that a first location information determination is identical, or near identical, to a second location information determination. In this scenario, it may be presumed that the mobile device 124 is stationary (step 506). As a result of this determination, the setback controls may be maintained in their current state. In some embodiments, the time periods between determinations of the location information such as location, direction of travel and/or rate of travel of the mobile device 124 may be affected based on rules (step 510). In one embodiment, a timer may be included that expresses a period of time that must pass or expire before subsequent determinations of location information can be made. In some situations, the timer may be set to "zero," or no time, to facilitate an immediate subsequent location information determination. Exemplary rules that direct timer state may include variably delaying subsequent determination based on device 124 location.

On the other hand, if it is determined that the mobile device 124 is traveling toward the room 112, the method continues at step 512 by determining whether the mobile device 124 is in an immediate zone, or distance, from the room 112. One or more immediate zones may be preset to include areas close to (e.g., within one mile of) the room 112 and/or facility 300. These zones may be associated with different rules to govern the level of setback that may be modified by the setback controls system server 224 and/or setback controls logic 120 (step 516). For instance, the closest immediate zone may be associated with a rule that ensures a room 112 is operating in a non-setback condition. As such, when a mobile device 124 enters the closest immediate zone, the rule will direct that the room 112 is operating at non-setback levels of control. It is anticipated that the rules, zones, and distances may be programmed, configured, and even changed for each facility 300.

In some embodiments, the mobile device 124 may be determined to be located outside of the immediate zone, but may still be travelling toward the room 112. The method continues in this instance by estimating the time of arrival (ETA) for the mobile device 124 associate with the room 112 (step 520). The ETA may be based on an average distance traveled over a given time period, thus yielding an average rate of travel. Additionally or alternatively, the ETA may be based on instantaneous rates of travel and/or location (e.g., using multiple location determinations over shorter periods of time). In some embodiments, the number of location information determinations, or sampling rate, may be set for each zone and/or increased as the mobile device 124 approaches the room 112 and/or multi-room facility 300. For example, the sampling rate of a mobile device 124 located in a third zone 308c may be equal to one sample every five minutes. If the device 124 is located in the second zone 308b, the sampling rate may be one sample per minute. A device 124 in the first zone 308a may report location information at a sampling rate of three samples per minute. This sampling rate may be adjusted depending on rules and/or the rate of travel associated with a device 124. For instance, it may be determined that a device 124 is approaching the second zone 308b from the third zone 308c at a rate of speed that, when extrapolated, places the device 124 to arrive in the first zone 308a in less than a minute. In this case, the sampling rate may be dynamically and/or automatically increased to, among other things, report greater location information accuracy of the device 124.

It is an aspect of the present disclosure that the setback controls can be coordinated with this ETA and ensure that the arrival of the occupant coincides with the normal operating settings, including temperatures, of the room 112 (step 524). In some embodiments, these setback controls may be adjusted by rule and zone. For example, a mobile device 124 traveling from a third zone 308c to a second zone 308b may prompt the system to adjust the setback controls from a deep-level setback to a mid-level setback. Similar to the sampling rate, the setback controls by zone may be adjusted dynamically based on updated ETA and/or location information.

If it is determined that the mobile device 124 is traveling away the room 112, the method continues at step 528 by determining whether the mobile device 124 is in an outer zone of distance from the room 112. One or more outer zones may be preset to include areas at greater distances (e.g., one or more miles) from the room 112 and/or facility 300. These zones may be associated with different rules to govern the level of setback that may be modified by the setback controls system server 224 and/or setback controls logic 120 (step 532). For instance, the farthest outer zone may be associated with a rule that ensures a room 112 is operating in a deep-level setback condition. As such, when a mobile device 124 enters the farthest outer zone, the rule will direct that the room 112 is operating at a deep-level setback.

If it is determined that the device 124 is not at an outer zone, but is traveling away from the room 112, the setback controls associated with that room 112 may be adjusted based on rules (step 536). The rules may direct the setback controls to maintain, adjust, and/or deactivate controls associated with a room 112. Furthermore, the rules may be based on data received from the mobile device 124 including but not limited to direction of travel, rate of travel, location, zone, and/or combinations thereof.

Once the adjustment, including the possible maintenance (not changing), of setback controls has been made, the method may continue by repeating the method from step 504. Additionally or alternatively, the method may continue by passing through a possible timer based on rules at step 510. It is anticipated that the timer may be included to set a period of time that must pass or expire before subsequent determinations of location information can be made. In some situations, the timer may be set to "zero," or no time, to facilitate an immediate subsequent location information determination. As previously stated, exemplary rules that direct timer state may include variably delaying subsequent determination based on device 124 location.

While the above-described flowcharts have been discussed in relation to a particular sequence of events, it should be appreciated that changes to this sequence can occur without materially effecting the operation of the disclosure. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The present disclosure, in various embodiments, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

Additionally, the systems, methods and protocols of this disclosure can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this disclosure.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover though the description of the disclosure has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of controlling an operating condition of a thermostat, comprising:
    associating a mobile device with a controlled space comprising the thermostat;
    detecting a state of a door of the controlled space;
    determining, based at least on the detected state, a setback condition for the controlled space; and
    sending, in response to determining the setback condition, a setback control options message to the mobile device that is associated with the controlled space.

2. The method of claim 1, further comprising:
    receiving input provided via the mobile device; and
    controlling the operating condition of the thermostat based on the input received from the mobile device.

3. The method of claim 1, wherein the state of the door is based on a message sent via a lock associated with the door.

4. The method of claim 1, comprising initiating the setback condition if no response to the setback control options message is received from the mobile device.

5. The method of claim 1, comprising monitoring the location of the mobile device.

6. The method of claim 1, wherein the setback control options message includes options for selectively controlling an operation of the thermostat.

7. The method of claim 6, wherein one of the options for selectively controlling an operation of the thermostat corresponds to initiating the setback condition.

8. The method of claim 6, wherein one of the options for selectively controlling an operation of the thermostat corresponds to resending the setback control options message to the mobile device after a period of time.

9. The method of claim 6, wherein one of the options for selectively controlling an operation of the thermostat corresponds to initiating a timer before initiating the setback condition.

10. The method of claim 6, wherein one of the options for selectively controlling an operation of the thermostat corresponds to ceasing to initiate the setback condition.

11. The method of claim 10, wherein the one of the options for selectively controlling an operation of the thermostat further corresponds to resending the setback control options message to the mobile device after a period of time.

12. The method of claim 1, wherein the setback control options message is sent to an application running on the mobile device, and wherein the message is sent via a setback control system server in communication with the thermostat.

13. A method of controlling an operating condition of a thermostat, comprising:
   detecting an activity at a door lock;
   sending, in response to detecting the activity, a message to a mobile device associated with a controlled space comprising the thermostat, wherein the message includes options for selection via the mobile device;
   receiving, at a controller of the thermostat, operating condition control instructions sent via the mobile device, wherein the operating control instructions sent via the mobile device comprise a selection of an option; and
   setting, via the controller, the operating condition of the thermostat based on the operating condition control instructions.

14. The method of claim 13, wherein prior to sending the message to the mobile device, the method comprises:
   determining whether a room associated with the door lock is occupied or unoccupied and sending the message only when the room is determined to be unoccupied.

15. The method of claim 14, comprising monitoring the location of the mobile device.

16. The method of claim 13, wherein the operating condition corresponds to a setback condition or a non-setback condition.

17. The method of claim 16, wherein the operating condition corresponds to a non-setback condition and further comprising resending the message to the mobile device after a period of time.

18. The method of claim 16, comprising initiating a timer before initiating the operating condition of the thermostat.

19. The method of claim 16, further comprising:
   sending, via the door lock, a wireless message to the controller when the door is at least one of opened by key, opened from a side inside a room, and closed.

* * * * *